United States Patent
Kim et al.

(10) Patent No.: US 12,545,922 B2
(45) Date of Patent: Feb. 10, 2026

(54) COMPOSITION FOR PROMOTING PLANT GROWTH COMPRISING YXAL PROTEIN OR HOMOLOGOUS PROTEIN THEREOF, AND METHOD FOR MASS PRODUCTION OF YXAL PROTEIN

(71) Applicants: DAEGU CATHOLIC UNIVERSITY INDUSTRY ACADEMIC COOPERATION FOUNDATION, Gyeongsan-si (KR); REPUBLIC OF KOREA (MANAGEMENT : RURAL DEVELOPMENT ADMINISTRATION), Jeonju-si (KR); SEOUL NATIONAL UNIVERSITY R&DB FOUNDATION, Seoul (KR)

(72) Inventors: Yong Hak Kim, Seoul (KR); Yun Hee Choi, Daegu (KR); Jae Kyeong Song, Iseo-myeon (KR); Nam Chul Ha, Seoul (KR)

(73) Assignees: DAEGU CATHOLIC UNIVERSITY INDUSTRY ACADEMIC COOPERATION FOUNDATION, Gyeongsangbuk-Do (KR); REPUBLIC OF KOREA (MANAGEMENT : RURAL DEVELOPMENT ADMINISTRATION), Jeollabuk-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 1038 days.

(21) Appl. No.: 17/284,331

(22) PCT Filed: Oct. 10, 2019

(86) PCT No.: PCT/KR2019/013293
§ 371 (c)(1),
(2) Date: Apr. 9, 2021

(87) PCT Pub. No.: WO2020/076095
PCT Pub. Date: Apr. 16, 2020

(65) Prior Publication Data
US 2022/0204985 A1    Jun. 30, 2022

(30) Foreign Application Priority Data

Oct. 10, 2018 (KR) .................. 10-2018-0120736

(51) Int. Cl.
*C12N 15/82* (2006.01)
*C07K 14/32* (2006.01)
*C12N 15/67* (2006.01)

(52) U.S. Cl.
CPC .......... *C12N 15/8261* (2013.01); *C07K 14/32* (2013.01); *C12N 15/67* (2013.01); *C12N 15/8257* (2013.01)

(58) Field of Classification Search
None
See application file for complete search history.

(56) References Cited

FOREIGN PATENT DOCUMENTS

| CN | 1329619 A | 1/2002 |
| CN | 107205404 A | 9/2017 |
| CN | 113286873 A | 8/2021 |

OTHER PUBLICATIONS

Al-Shehbaz, Ihsan A., and Steve L. O'Kane Jr. "Taxonomy and phylogeny of *Arabidopsis* (Brassicaceae)." The *Arabidopsis* Book/ American Society of Plant Biologists 1 (2002). (Year: 2002).*
Britannica, The Editors of Encyclopaedia. "homology". Encyclopedia Britannica, Nov. 8, 2024, https://www.britannica.com/science/homology-evolution. Accessed Nov. 15, 2024. (Year: 2024).*
U.S. National Library of Medicine. (Jan. 29, 2015). Bacillus amyloliquefaciens CC178, complete genome—NCBI. National Center for Biotechnology Information (Year: 2015).*
Noirot-Gros, M-F., et al. "The beta-propeller protein YxaL increases the processivity of the PcrA helicase." Molecular Genetics and Genomics 267 (2002): 391-400. (Year: 2002).*
Deng, Liping, et al. "Cell-to-cell natural transformation in Bacillus subtilis facilitates large scale of genomic exchanges and the transfer of long continuous DNA regions." Nucleic Acids Research 51.8 (2023): 3820-3835. (Year: 2023).*
Stephenson, Frank H. "Chapter 10—Recombinant DNA." Calculations for molecular biology and biotechnology (2016): 321-373. (Year: 2016).*
Koornneef, Maarten, and David Meinke. "The development of *Arabidopsis* as a model plant." The plant journal 61.6 (2010): 909-921. (Year: 2010).*
Garcia-Hernandez, Margarita, et al. "TAIR: a resource for integrated *Arabidopsis* data." Functional & integrative genomics 2 (2002): 239-253. (Year: 2002).*

(Continued)

*Primary Examiner* — Amjad Abraham
*Assistant Examiner* — Brian James Sullivan
(74) *Attorney, Agent, or Firm* — DILWORTH IP, LLC

(57) ABSTRACT

The present disclosure relates to a composition for promoting plant growth containing an YxaL protein and a method for mass-producing an YxaL protein. The YxaL protein may be expressed constitutively and in large amounts in a recombinant transformed cell line. When the YxaL protein is applied to seed soaking treatment, root development is improved, and the expression of plant genes involved in root growth is improved in favor of plant growth. Thus, the YxaL protein may be effectively used to promote plant growth.

1 Claim, 9 Drawing Sheets
Specification includes a Sequence Listing.

(56) References Cited

OTHER PUBLICATIONS

Meyerowitz, Elliot M. "*Arabidopsis*, a useful weed." Cell 56.2 (1989): 263-269. (Year: 1989).*
Petricka, Jalean J., Cara M. Winter, and Philip N. Benfey. "Control of *Arabidopsis* root development." Annual review of plant biology 63.1 (2012): 563-590. (Year: 2012).*
Ponnu, Jathish, and Ute Hoecker. "Signaling mechanisms by *Arabidopsis* cryptochromes." Frontiers in Plant Science 13 (2022): 844714. (Year: 2022).*
Kumar, Kundan, Susheel Kumar Raina, and Sheikh M. Sultan. "*Arabidopsis* MAPK signaling pathways and their cross talks in abiotic stress response." Journal of Plant Biochemistry and Biotechnology 29.4 (2020): 700-714. (Year: 2020).*
U.S. National Library of Medicine. (Jan. 30, 2014). Putative WD repeat-containing protein [bacillus amyloliquefaciens it-45—protein—NCBI. National Center for Biotechnology Information (Year: 2014).*
Kim, Yong-Hak, et al. "Plant growth-promoting activity of beta-propeller protein YxaL secreted from Bacillus velezensis strain GH1-13." PLoS One 14.4 (2019): e0207968. (Year: 2019).*
Kim, Sang Yoon, et al. "Characterization of multifunctional *Bacillus* sp. GH1-13." The Korean Journal of Pesticide Science 20.3 (2016): 189-196. (Year: 2016).*
Kim, Sang Yoon, et al. "The complete genome sequence of Bacillus velezensis strain GH1-13 reveals agriculturally beneficial properties and a unique plasmid." Journal of biotechnology 259 (2017): 221-227. (Year: 2017).*

Tompkins, T.A. et al.; "Bacillus amyloliquefaciens IT-45, complete genome"; Genbank database, CP004065 Region: 119977 . . . 121224.
Noirot-Gros, M-F., et al. "The beta-propeller protein YxaL increases the processivity of the PcrA helicase." Molecular Genetics and Genomics 267 (2002): 391-400.
International Search Report from WIPO in Application No. PCT/KR2019/013293 dated Feb. 3, 2020.
NCBI. GenBank accession No. CCG51893, putative WD repeat-containing protein [Bacillus velezensis YAU B9601-Y2], 3 pages.
Hao, K. et al., The Genome of Plant Growth-Promoting *Bacillus amyloliquefaciens* subsp. plantarum Strain YAU 89601-Y2 Contains a Gene Cluster for Mersacidin Synthesis, Journals ASM.org, Genome Announcement, Journal of Bacteriolog, pp. 3264-3265, vol. 194, No. 12, Jun. 2012.
Bacillus amyloliquefacines CC178, complete genome; 3 pages.
Kim et al., Characterization of Multifunctional *Bacillus* sp. GH1-13, Korean J. Pestic. Sci., vol. 20, No. 3, pp. 186-196 (2016).
Kim, S. Y. et al., The complete genome sequence of Bacillus velezensis strain GH1-13 reveals agriculturally beneficial properties and a unique plasmid, Journal of Biotechnology, 259, pp. 221-227, 2017.
Kim, Y.-H. et al., Plant Growth-Promoting Activity of Beta-Propeller Protein YxaL Secreted from Bacillus velezensis Strain GH1-13, bioRxiv preprint first posted online Nov. 16, 2018; doi: http://dx.doi.org/10.1101/471185.

* cited by examiner (a)

(b)

Incubation of concentrated supernatant of 48-h culture
with (+) or without (−) treatment of 2 mg L$^{-1}$ protease K

US 12,545,922 B2

COMPOSITION FOR PROMOTING PLANT GROWTH COMPRISING YXAL PROTEIN OR HOMOLOGOUS PROTEIN THEREOF, AND METHOD FOR MASS PRODUCTION OF YXAL PROTEIN

SEQUENCE LISTING

The instant application contains a Sequence Listing which has been submitted electronically in ASCII format and is hereby incorporated by reference in its entirety. Said ASCII copy, created on Oct. 12, 2021, is named 393-016US_SL.txt and is 21,165 bytes in size.

TECHNICAL FIELD

The present disclosure relates to a composition for promoting plant growth containing an YxaL protein or a protein homologous thereto, and a method for mass-producing the YxaL protein.

The present disclosure was made with the support of the Korean government under grant number 1395055329 ("Study on Synthesis Pathway of Multifunctional Active Substance and Function and Structure of Enzyme Protein") awarded by the Rural Development Administration.

BACKGROUND ART

Plants are always exposed to various external stresses, and the ability of plant roots to absorb necessary substances from the soil is lost due to these stresses. For this reason, plants are unable to produce sufficient vitamins, amino acids, hormones, etc., and problems arise in terms of growth, development and productivity of the plants. As a way to overcome these problems, plant growth promoters for helping plant growth have been developed.

The major components of general plant growth promoter that are currently used include plant hormones, humic acid, and seaweed extracts. However, currently commercially available plant growth promoters have a problem in that, since they are composed of various chemical substances, the effect thereof is not clear.

Meanwhile, the YxaL protein reported to interact with DNA helicase PcrA in *Bacillus subtilis* strain contains a signal peptide for passage through the cytoplasmic membrane at the N-terminus thereof. In this regard, it remains a difficult problem to predict the interaction site between the extracellular protein YxaL and the intracellular helicase PcrA or DNA. In addition, the mature portion of YxaL from which the N-terminal signal peptide was removed is predicted to contain a repeated pyrrolo-quinoline quinone (PQQ) domain that forms a beta-propeller structure, but the intracellular location and function of YxaL have not been reported at all.

Accordingly, the present inventors have conducted studies to develop a plant growth promoter and a method for mass production thereof, thereby completing the present disclosure.

DISCLOSURE

Technical Problem

An object of the present disclosure is to provide a composition for promoting plant growth containing an YxaL protein or protein homologous thereto.

Another object of the present disclosure is to provide a recombinant expression vector comprising: a DNA fragment consisting of the nucleotide sequence of SEQ ID NO: 25; and a promoter operably linked to the DNA fragment.

Still another object of the present disclosure is to provide a transformed cell line for mass-producing an YxaL protein, the transformed cell line comprising the recombinant expression vector.

Yet another object of the present disclosure is to provide a method for mass-producing an YxaL protein, the method comprising a step of overexpressing the YxaL protein by transforming *E. coli* with the recombinant expression vector.

Technical Solution

One aspect of the present disclosure provides a composition for promoting plant growth containing an YxaL protein or a protein homologous thereto.

According to one embodiment of the present disclosure, the protein may be derived from a *Bacillus velezensis* strain.

According to one embodiment of the present disclosure, the *Bacillus velezensis* strain may be *Bacillus velezensis* strain GH1-13.

According to one embodiment of the present disclosure, the YxaL protein may consist of the amino acid sequence of SEQ ID NO: 20.

According to one embodiment of the present disclosure, the homologous protein may comprise the amino acid sequence of any one selected from the group consisting of SEQ ID NOs: 4 to 19.

According to one embodiment of the present disclosure, the plant may be *Arabidopsis* or rice.

Another aspect of the present disclosure provides a recombinant expression vector comprising: a DNA fragment consisting of the nucleotide sequence of SEQ ID NO: 25; and a promoter operably linked to the DNA fragment.

According to one embodiment of the present disclosure, the DNA fragment may be derived from *Bacillus velezensis* strain GH1-13.

Still another aspect of the present disclosure provides a transformed cell line for mass-producing an YxaL protein, the transformed cell line comprising the recombinant expression vector.

Yet another aspect of the present disclosure provides a method for mass-producing an YxaL protein, the method comprising a step of overexpressing the YxaL protein by transforming *E. coli* with the recombinant expression vector.

Advantageous Effects

According to the composition for promoting plant growth containing an YxaL protein and the method for mass-producing an YxaL protein, the YxaL protein may be expressed constitutively in a recombinant transformed cell line and isolated from culture medium. When the YxaL protein is applied to seed soaking treatment, root development is improved, and the expression of plant genes involved in root growth is improved in favor of plant growth. Thus, the YxaL protein may be effectively used to promote plant growth.

BRIEF DESCRIPTION OF DRAWINGS

FIG. 2(a) shows the results of eluting a recombinant YxaL protein with a N-His TEV cleavage site in a stepwise manner using high-concentration imidazole (50 to 250 mM) and purifying the eluted YxaL protein, and FIG. 2(b) shows the results of size exclusion chromatography and SDS PAGE analysis that indicate the size and purity of the purified YxaL protein.

FIG. 4(a) shows the results indicating that the YxaL protein is expressed constitutively in cells and secreted out of the cells, and FIG. 4(b) shows the results indicating that about 100 µg/l of an YxaL protein having a half-life of about 1.6 hours was produced in the supernatant.

FIG. 9(a) depicts photographs showing the appearances of the 1-week-old roots of rice treated with various concentrations of a purified YxaL protein in a soaking solution, FIG. 9(b) is a graph showing the lengths of main roots, and FIG. 9(c) is a graph showing the lengths of rootlets.

BEST MODE

Figure 1:
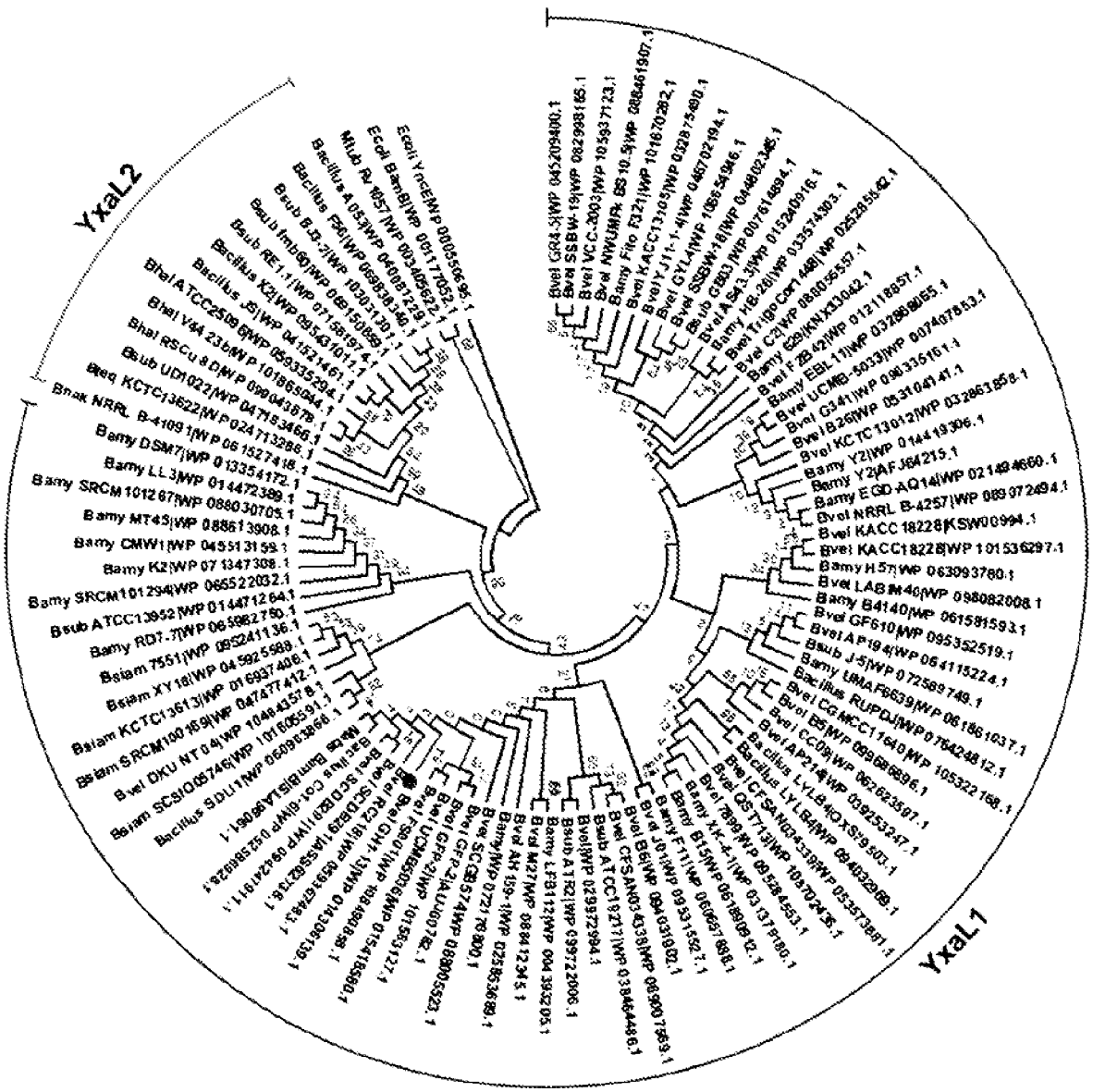
FIG. 1 shows the results of phylogenetic analysis of YxaL homologous protein sequences. *Bacillus velezensis* strain GH1-13 used in the present disclosure is indicated by a red circle.

One aspect of the present disclosure provides a composition for promoting plant growth containing an YxaL protein or a protein homologous thereto.

In the present disclosure, there are provided an YxaL protein, which may be used to promote plant growth, and a method for mass-producing the YxaL protein.

As used herein, the term "promoting plant growth" refers to improving plant growth and metabolism, and may include, for example, new plant growth, root development, and cell expansion. The composition for promoting plant growth containing an YxaL protein according to the present disclosure may improve root development and improve the expression of plant genes, which are involved in root growth, in favor of plant growth. Thus, the composition may be effectively used to promote plant growth.

As used herein, the term "homologous protein" refers to proteins of the same origin, which have similar amino acid sequences and three-dimensional structures.

In the present disclosure, the homology of the amino acid sequence of the YxaL protein and the sequence and position of the beta-propeller motif were compared, whereby the YxaL protein was classified into two types of YxaL1 and YxaL2 consensus sequences. YxaL protein types, which have high amino acid sequence homologies and highly conserved amino acid sequences, were identified as shown in Table 1 below.

TABLE 1

| Type | Amino acid sequence | SEQ ID NO |
|---|---|---|
| YxaL1 (415 amino acid residues) | MKKKTASLRMKTLAAGAAVAAALSVGAVSDLPGAKWLHPAAAQAAE TVFKQNHAASGFLAGRYDAQAMSPTMFNWSRESRFTSTADGALKWE KNVPANPQNGAGAAVDGDGTVFIQSKDGKLTAYHPDGTVKWVTENL GTTYTLTPVLGTNGVIYLPSHDKKLYFIDKETGNILTSVPLSGAPS SDAAIGSDGTLYVSTLDNYIYAIKPTSPSTWTQKWKFKTNGVVGSA PVLASNGTLYTATYNNIFYAINSGTGQVKWSKTTSNGFKGYPVIDR DGTVYAGNQDGNLYAYTSTGAVKWTFPLNGFSSSSLAIDHNGNVYI GSGSGELFSISKTGNMNWSFYTDGPVRTAPLIDADGNVYFGSDDKN VYAVDADGNEKWRYQTDSNVISSPVLAEDGTLYVGTYTKLLAFGAK K | SEQ ID NO: 1 |
| YxaL2 (394 amino acid residues) | MKALIAGAAVAAAVSAGAVSDVPAAKVLQPAAAYAAETVFSQNNEA SGFLTGRYDVQAMAPAMFNWSRESRFAGNTDGTLKWQNDIRTTPQN GAGAVIDGDGTVYLHSRDGEMKAFNPDGSVKWVTGNLGKTFTQSPV LGTNGVIYLASYDKKIYFIDKETGEILTTVPLSGGPSSETVIGSDG TLYFSTLDNYVHAIKPTSKSTWTERWKLKTNGVVSSVPVLAKNGTV YVGTYNNVFYAINSGTGQVKWSRTTSNAFKGYPVIDKDGTVYAGNQ DGQLYAYTSTGSLKWTFPLNGFSSSSPAIDHNGNIYIGSGSGELFS ISKNGDMNWSFYTDGPVRTAPLIDAKGTVYFGSDDMKVYAADANGN ELWSYQTDSNVVSSPQLAEDGTLYIG | SEQ ID NO: 2 |

Meanwhile, the sequences and positions (Table 2) of the beta-propeller and motif contained in the YxaL type proteins were identified as shown in Table 3 below.

TABLE 2

|  | Amino acid sequence | SEQ ID NO |
|---|---|---|
| PQQ beta-propeller | AXDXXTGDXXW | SEQ ID NO: 3 |
| Motif | --N----E--- | SEQ ID NO: 40 |
|  | -------K--- | SEQ ID NO: 41 |

TABLE 3

| Type | Motif | Amino acid sequence | Position in YxaL type amino acid sequence | SEQ ID NO |
|---|---|---|---|---|
| YxaL1 | YxaL1-1 | FTSTADGALKW | 81-91 | SEQ ID NO: 4 |
|  | YxaL1-2 | TAYHPDGTVKW | 123-133 | SEQ ID NO: 5 |
|  | YxaL1-3 | FIDKETGNILT | 165-175 | SEQ ID NO: 6 |
|  | YxaL1-4 | PTSPSTWTQKW | 209-219 | SEQ ID NO: 7 |
|  | YxaL1-5 | AINSGTGQVKW | 250-260 | SEQ ID NO: 8 |
|  | YxaL1-6 | YAYTSTGAVKW | 290-300 | SEQ ID NO: 9 |
|  | YxaL1-7 | FSISKTGNMNW | 330-340 | SEQ ID NO: 10 |
|  | YxaL1-8 | YAVDADGNEKW | 370-380 | SEQ ID NO: 11 |
| YxaL2 | YxaL2-1 | FAGNTDGTLKW | 72-82 | SEQ ID NO: 12 |
|  | YxaL2-2 | KAFNPDGSVKW | 114-124 | SEQ ID NO: 13 |
|  | YxaL2-3 | FIDKETGEILT | 156-166 | SEQ ID NO: 14 |
|  | YxaL2-4 | PTSKSTWTERW | 200-210 | SEQ ID NO: 15 |
|  | YxaL2-5 | AINSGTGQVKW | 241-251 | SEQ ID NO: 16 |
|  | YxaL2-6 | YAYTSTGSLKW | 281-291 | SEQ ID NO: 17 |
|  | YxaL2-7 | YAYTSTGSLKW | 321-331 | SEQ ID NO: 18 |
|  | YxaL2-8 | YAADANGNELW | 361-371 | SEQ ID NO: 19 |

Since the YxaL1 type protein having high homology to the amino acid sequence of the YxaL protein and having the same beta-propeller motif as that of the YxaL protein is named *Mycobacteroides abscessus* subsp. *massiliense* BamB (NCBI accession no. SLA98061.1), the name of the YxaL homologous protein and the name of bacterial species from which the YxaL homologous protein originates may be specified differently.

The composition for promoting plant growth according to the present disclosure may further contain one or more known components that exhibit plant growth promoting activity in addition to the YxaL protein.

The composition for promoting plant growth according to the present disclosure may be used in varying amounts for varying periods of time to treat a plant depending on the kind of the plant and the degree of development of the plant. For use, the composition for promoting plant growth according to the present disclosure may be added to a soaking solution during seed soaking. Where the composition is added to a seed soaking solution for use, it may be added at a concentration of 0.01 to 100 mg/l, preferably 0.1 to 10 mg/l, most preferably 0.5 to 5 mg/l.

When the composition for promoting plant growth according to the present disclosure is sprayed to the seedlings, leaves or roots of a plant or the soil around the plant roots, the composition may be sprayed before or after spraying of a fertilizer or an agricultural chemical to the plant, or may be sprayed with a fertilizer or an agricultural chemical, or may be sprayed alone. The fertilizer may be an inorganic or organic fertilizer commonly used in plant cultivation, and may contain, for example, nitrogen, phosphoric acid, potassium, a mineral and/or a trace element. The inorganic material may be any one or more selected from among calcium, magnesium, sulfur, and iron, and the trace element may be any one or more selected from among manganese, copper, zinc, boron, and molybdenum. The agricultural chemical may be a fungicide, pesticide and/or herbicide commonly used in plant cultivation.

According to one embodiment of the present disclosure, the protein may be derived from a *Bacillus velezensis* strain.

According to one embodiment of the present disclosure, the *Bacillus velezensis* strain may be a strain belonging to the *Bacillus amyloliequefaciens-siamensis-velezensis* group related to soil and plants.

According to one embodiment of the present disclosure, the *Bacillus velezensis* strain may be *Bacillus velezensis* strain GH1-13.

The plant growth promoting effect of the YxaL protein derived from the *Bacillus velezensis* strain GH1-13 was specifically confirmed in the present specification. Therefore, the YxaL protein contained in the composition for promoting plant growth according to the present disclosure is preferably derived from the *Bacillus velezensis* strain GH1-13.

According to one embodiment of the present disclosure, the YxaL protein may consist of the amino acid sequence of SEQ ID NO: 20.

The amino acid sequence of SEQ ID NO: 20 is derived from the *Bacillus velezensis* strain GH1-13, and the protein consisting of the amino acid sequence of SEQ ID NO: 20 is a protein consisting of amino acid residues 45 to 415 except amino acid residues 1 to 44 (constituting a cell membrane signal sequence) in the amino acid sequence of SEQ ID NO: 1 (Table 4).

TABLE 4

|  | Amino acid sequence | SEQ ID NO |
|---|---|---|
| Amino acid sequence of mature YxaL derived from *Bacillus velezensis* GH1-13 strain | MKKKTASLRMKTLAAGAAVAAALSVGAVSDLP GAKWLHPAAAQAAETVFKQNHAASGFLAGRYD AQAMSPTMFNWSRESRFTSTADGALKWEKNVP ATPQNGAGAAVDGDGTVFIQSKDGKLTAYHPD GTVKWVTENLGTTYTLTPVLGTNGVIYLPSHD KKLYFIDKETGNILTSVPLSGAPSSDAAIGSD GTLYVSTLDNYIYAIKPTSPSTWTQKWKFKTN GVVGSAPVLASNGTLYTATYNNIFYAINSGTG QVKWSKTTSNGFKGYPVIDRDGTVYAGNQDGN LYAYTSTGAVKWTFPLNGFSSSSLAIDHNGNV YIGSGSGELFSISKTGNMNWSFYTDGPVRTAP LIDADGNVYFGSDDKNVYAVDADGNEKWRYQT DSNVISSPVLAEDGTLYVGTYTKLLAFGAKK | SEQ ID NO: 20 |

According to one embodiment of the present disclosure, the homologous protein may comprise the amino acid sequence of any one selected from the group consisting of SEQ ID NOs: 4 to 19.

In the proteins homologous to the YxaL protein, the homologous proteins comprising the amino acid sequences of SEQ ID NOs: 4 to 19, respectively, which are beta-propeller motifs, may exhibit a plant growth-promoting effect, like the YxaL protein.

According to one embodiment of the present disclosure, the plant may be *Arabidopsis* or rice.

It was specifically confirmed in the present specification that the YxaL protein contained in the composition for promoting plant growth according to the present disclosure has the effect of promoting root development in *Arabidopsis* and rice and the effect of improving the expression of plant genes involved in root growth. Thus, the composition for promoting plant growth according to the present disclosure may be effectively used to promote the growth of plants, for example, *Arabidopsis* and rice.

Another aspect of the present disclosure provides a recombinant expression vector comprising: a DNA fragment consisting of the nucleotide sequence of SEQ ID NO: 25; and a promoter operably linked to the DNA fragment.

The recombinant expression vector of the present disclosure comprises a gene encoding the YxaL protein, specifically a DNA fragment consisting of the nucleotide sequence of SEQ ID NO: 25. When the recombinant expression vector of the present disclosure is transformed into, for example, *E. coli*, it may induce the constitutive expression of yxaL gene. Thus, the recombinant expression vector of the present disclosure may be effectively used for mass production of the YxaL protein.

For PCR amplification and cloning of the YxaL (amino acid residues 45 to 415) gene nucleotide sequence, the primer sequences of SEQ ID NOs: 21 and 22 (Table 5) may be used and may also be used after processing (SEQ ID NOs: 23 and 24).

TABLE 5

| Primer | Primer nucleotide sequence (5'→3') | SEQ ID NO |
|---|---|---|
| YxaL Forward | GCGGAAACGGTATTTAAACAAAAT | SEQ ID NO: 21 |
| Reverse | TTATTTTTTTGCCCCGAATGCGA | SEQ ID NO: 22 |

As used herein, the term "recombinant expression vector" refers to a recombinant DNA molecule containing a desired coding sequence and appropriate nucleic acid sequences essential for the expression of an operably linked coding sequence in a particular host organism. Promoters, enhancers, and termination and polyadenylation signals, which may be used in eukaryotic cells, are known.

As used herein, the term "operably linked" refers to a functional linkage between a gene expression control sequence and another nucleotide sequence. The gene expression control sequence may be at least one selected from the group consisting of a replication origin, a promoter, and a transcription termination sequence (terminator). The transcription termination sequence may be a polyadenylation sequence (poly-A), and the replication origin may be, but is not limited to, an f1 replication origin, an SV40 replication origin, a pMB1 replication origin, an adeno replication origin, an AAV replication origin or a BBV replication origin.

As used herein, the term "promoter" means a region of DNA upstream from the structural gene, and refers to a DNA molecule to which RNA polymerase binds to initiate transcription.

The promoter according to one embodiment of the present disclosure is one of the transcription control sequences which control the transcription initiation of a specific gene, and may be a polynucleotide fragment of about 100 bp to about 2,500 bp in length. For example, the promoter may be selected from the group consisting of a cytomegalovirus (CMV) promoter (e.g., human or mouse CMV immediate-early promoter), U6 promoter, EF1-alpha (elongation factor 1-a) promoter, EF1-alpha short (EFS) promoter, SV40 promoter, adenovirus promoter (major late promoter), pL-λ promoter, trp promoter, lac promoter, tac promoter, T7 promoter, vaccinia virus 7.5K promoter, HSV tk promoter, SV40E1 promoter, respiratory syncytial virus (RSV) promoter, metallothionin promoter, β-actin promoter, ubiquitin C promoter, human interleukin-2 (IL-2) gene promoter, human lymphotoxin gene promoter, and human granulocyte-macrophage colony stimulating factor (GM-CSF) gene promoter, but is not limited thereto.

The recombinant expression vector according to one embodiment of the present disclosure may be selected from the group consisting of plasmid vectors, cosmid vectors, and viral vectors such as bacteriophage vectors, adenovirus vectors, retroviral vectors, and adeno-associated viral vectors. A vector that may be used as the recombinant expression vector may be constructed based on, but not limited to, a plasmid (e.g., pcDNA series, pSC101, pGV1106, pACYC177, ColE1, pKT230, pME290, pBR322, pUC8/9, pUC6, pBD9, pHC79, pIJ61, pLAFR1, pHV14, pGEX series, pET series, pUC19, etc.), a phage (e.g., λgt4λB, λ-Charon, λΔz1, M13, etc.), a viral vector (e.g., an adeno-associated viral (AAV) vector, etc.), or the like, which is used in the art.

The recombinant expression vector of the present disclosure may further comprise at least one selectable marker. The marker is generally a nucleic acid sequence having the property capable of being selected by a conventional chemical method, and includes any gene capable of distinguishing a transfected cell from a non-transfected cell. Examples of the marker include, but are not limited to, genes resistant to herbicides such as glyphosate, glufosinate ammonium or phosphinothricin, and genes resistant to antibiotics such as ampicillin, kanamycin, G418, bleomycin, hygromycin or chloramphenicol.

The recombinant expression vector of the present disclosure may be constructed using a gene recombination technique well known in the art, and site-specific DNA cleavage and ligation may be performed using enzymes generally known in the art.

According to one embodiment of the present disclosure, the *Bacillus velezensis* strain may be *Bacillus velezensis* strain GH1-13.

Still another aspect of the present disclosure provides a transformed cell line for mass-producing an YxaL protein, the transformed cell line comprising a recombinant expression vector comprising: a DNA fragment consisting of the nucleotide sequence of SEQ ID NO: 25; and a promoter operably linked to the DNA fragment.

In order to produce a transformed cell line comprising the recombinant expression vector according to one embodiment of the present disclosure, a method known in the art for introducing a nucleic acid molecule into an organism, a cell, a tissue or an organ may be used, and as known in the art, a suitable standard technique selected depending on the host cell may be performed. Examples of this method include, but are not limited to, electroporation, calcium phosphate ($CaPO_4$) precipitation, calcium chloride ($CaCl_2$)) precipitation, microinjection, polyethylene glycol (PEG) method, DEAE-dextran method, cationic liposome method, and lithium acetate-DMSO method.

Cells that may be used for the transformed cell line may be E. coli, but are not limited thereto.

Yet another aspect of the present disclosure provides a method for mass-producing an YxaL protein, the method comprising a step of overexpressing the YxaL protein by transforming E. coli with a recombinant expression vector comprising: a DNA fragment consisting of the nucleotide sequence of SEQ ID NO: 25; and a promoter operably linked to the DNA fragment.

The transformed cell line of the present disclosure, which comprises the recombinant expression vector of the present disclosure, may produce the YxaL protein by constitutive expression of the yxaL gene present in the recombinant expression vector. In addition, since the produced YxaL protein is released into medium, the YxaL protein may be purified from the culture medium of the transformed cell line of the present disclosure, and thus the transformed cell line may be effectively used to produce the YxaL protein in large amounts.

MODE FOR INVENTION

Hereafter, the present disclosure will be described in more detail with reference to one or more examples. However, these examples serve to explain the present disclosure by way of example, and the scope of the present disclosure is not limited to these examples.

Example 1. Method for Analysis of Plant Growth-Promoting Effect of YxaL Protein 1-1. Strain Culture and Measurement The *Bacillus velezensis* strain GH1-13 (FIG. 1) was revived from frozen stocks in 50% glycerol at −80° C. and then streaked on a TSB (trypticase soy broth) (BD, Sparks, USA) plate. Single colonies were cultured in TSB at 25° C. with aeration (180 rpm), and the growth of the strain was measured at an optical density of 600 nm (OD 600).

1-2. yxaL Gene Cloning and Protein Purification

The genomic DNA of the strain GH1-13 was extracted using a Wizard Genomic DNA Purification kit (Promega, Madison, USA). The DNA fragment encoding the mature YxaL protein (amino acid residues 45 to 415) was amplified by PCR with the following primers (Table 6).

TABLE 6

| Primer | | Primer nucleotide sequence (5'→3') | SEQ ID NO |
|---|---|---|---|
| YxaL | Forward | GGC CCATGGCGGAAACGGTATTTAAA CAAAAT | SEQ ID NO: 23 |
| | Reverse | GGG CTCGAGTTATTTTTTTGCCCCGA ATGCGA | SEQ ID NO: 24 |

The underlined NcoI and XhoI restriction enzyme sites are compatible with those in a pProEX-HTA plasmid with an N-His tag linked to a TEV protease cleavage site. After cloning the yxaL gene, the resulting pProEX-YxaL (N-His-TEV) plasmid was transformed into E. coli strain BL21 (DE3). The sequence of the DNA fragment amplified by the primers is shown in Table 7 below.

TABLE 7

| | Nucleotide sequence (5'→3') | SEQ ID NO |
|---|---|---|
| yxaL gene | ATGGCGGAAACGGTATTTAAACAAAATCATGCGGCATCCGGTTTCT TGGCGGGACGGTATGACGCGCAGGCGATGTCTCCGACGATGTTC AACTGGTCAAGAGAAAGCCGGTTTACAAGCACTGCCGATGGCGCA TTAAAATGGGAAAAGAATGTCCCGGCCACCCCTCAAAACGGTGCG GGAGCCGCGGTTGATGGGGACGGCACCGTATTTATTCAATCAAAA GACGGGAAGCTGACGGCGTATCATCCGGACGGTACTGTGAAATGG GTGACGGAAAACCTCGGGACGACCTATACGCTGACTCCGGTGCTC GGAACAAACGGTGTCATTTATCTTCCTTCTCACGATAAAAAACTATA TTTCATCGACAAAGAAACCGGAAACATTTTAACATCGGTTCCGTTG AGCGGAGCGCCTAGTTCCGATGCGGCTATCGGCTCTGACGGCAC GCTGTATGTGTCGACGCTGGATAACTATATCTATGCGATTAAACCGA CGTCGCCTTCGACATGGACGCAAAAGTGGAAGTTTAAAACAAACG GCGTGGTCGGCTCCGCTCCCGTGTTAGCGTCAAACGGCACGCTG TATACGGCAACGTACAATAATATCTTTTACGCGATCAATTCCGGAAC AGGCCAAGTGAAATGGTCAAAAACGACGTCCAACGGGTTTAAAGG CTATCCGGTTATTGATAGAGACGGCACCGTTTACGCCGGAAACCAG GACGGCAATTTATACGCCTATACATCAACGGGTGCTGTAAAGTGGA CGTTCCCGTTAAACGGTTTCTCCAGCTCTTCATTAGCGATCGACCA TAACGGCAATGTGTATATCGGTTCCGGAAGCGGCGAGCTGTTTTCC ATCAGCAAAACCGGCAATATGAACTGGTCTTTCTATACGGACGGGC CTGTGAGAACGGCGCCGCTGATTGATGCGGACGGCAATGTGTACT TCGGTTCTGACGATAAAAATGTCTATGCGGTTGACGCTGACGGTAA TGAAAAATGGCGCTATCAAACAGACAGCAATGTCATTTCCTCCCCG GTTCTGGCTGAAGACGGCACGCTCTATGTCGGCACTTATACGAAAC TGCTCGCATTCGGGGCAAAAAAATAA | SEQ ID NO: 25 |

For transformation, the strain, exponentially grown (turbidity at 600 nm=0.3) in LB medium by culture at 37° C. with shake (200 rpm), was kept on ice for 30 minutes to stop growth, and then centrifuged at 4,000 rpm at 4° C., and the supernatant was removed. Then, the strain was treated with a composition (5 g PEG8000, 1.5 ml 1M $MgCl_2$, 2.5 ml DMSO and LB medium) contained in 50 ml of TSS medium and kept on ice to obtain chemical competent cells to be used for transformation. 1 pg of a plasmid DNA cloned with the yxaL gene was mixed with 50 µl of TSS medium containing competent cells capable of forming $10^8$ colonies, and then kept on ice for 30 minutes. Then, the mixture was heat-shocked at about 41 to 42° C. for about 60 seconds, and then stabilized on ice for 5 minutes, and then mixed with 1 ml of SOC medium (containing, per liter of composition: 20 g tryptone, 5 g yeast extract, 0.5 g NaCl, 20 mM MgCl$_2$ and 20 mM glucose) preheated to 37° C. The resulting mixture was incubated at 37° C., thereby transforming the cells. The *E. coli* cells transformed with the plasmid containing the YxaL gene nucleotide sequence were confirmed by analyzing the DNA nucleotide sequence contained in the plasmid extracted from the colonies grown on the LB plate medium containing ampicillin (100 mg/1).

The transformed cells were cultured in 1 L of LB medium containing 100 mg of ampicillin at 37° C. with aeration (180 rpm), and when the cells reached an optical density of about 0.5, the cells were treated with 0.2 mM IPTG for 1 hour to induce overexpression of the recombinant YxaL protein. The cells were harvested, treated with 1 mM mercaptoethanol and a protease cocktail (Roche Diagnostics, Indianapolis, USA), and then disrupted by repeated ultrasonication in an ice-water bath.

Protein purification was performed at 4° C. After centrifugation at 21,000×g for 15 minutes, the supernatant was transferred to a new vessel, mixed with 20 mM imidazole and Ni NTA agarose (Qiagen, Hilden, Germany), and then agitated on a rotary shaker for 1 hour. The protein-bound agarose was loaded on a column, washed with 25 mM imidazole in 1×PBS (8 g NaCl, 0.2 g KCl, 1.44 g Na$_2$HPO$_4$, and 0.24 g KH$_2$PO$_4$ in 1000 mL water, pH 7.4), and the YxaL (N-His-TEV) protein was eluted within the fractions containing 100 to 150 mM imidazole.

After exchanging the buffer with 1×PBS using a G25 Sepharose desalting column, the purified protein was mixed with a His-tagged TEV protease at a ratio of 100:1 to remove the N-His-TEV site of the recombinant protein. At this time, in the process of performing digestion with TEV protease (N-His) to remove the N-His-TEV site from the recombinant protein, Ni NTA affinity chromatography was repeatedly performed to purify the YxaL protein.

1-3. Analysis of Size and Purity of Purified YxaL Protein

The size and purity of the purified protein were analyzed by size exclusion chromatography and SDS PAGE analysis.

Specifically, for size exclusion chromatography, 2 mg of the protein concentrate purified by the Ni-NTA column was loaded on Superdex™ 200 column (manufactured by GE Healthcare Life), and the protein absorbance (280 nm) was measured while the protein concentrate was eluted with 1×PBS solution at a rate of 0.5 ml/min. Fractions were collected every minute (0.5 mL).

Meanwhile, an aliquot (10 μl) of fractions showing the protein absorbance (280 nm) was mixed with the same amount of Laemmli buffer (containing 2% SDS, 10% glycerol, 25 mM Tris/HCl and a small amount of bromophenol blue indicator, pH 6.8) supplemented with 5% mercaptoethanol and deactivated by heating at 95° C. for 15 minutes. Then, 10% acrylamide gel was prepared according to the SDS PAGE method developed by Laemmli and was used for analysis.

1-4. Western Blotting

A purified anti-YxaL IgG was used as a primary antibody (diluted at 1:20,000), which was then detected using a secondary chicken anti-rabbit IgG antibody with horseradish peroxidase (HRP) conjugate (Abcam, Cambridge, UK) and a Western blotting detection kit (Advansta, Menlo Park, USA). Chemiluminescent images were acquired using a ChemiDoc XRS image analyzer (Bio-Rad, Hercules, USA), and images were processed using Molecular Dynamics ImageQuant software version 5.2 (GE Healthcare Life Science).

1-5. Gene Expression Analysis cDNA was synthesized using a QuantiTect Reverse Transcription Kit (Qiagen, Hilden, Germany) and quantitative PCR (qPCR) was performed using a Qiagen QuantiTect SYBR Green PCR Kit with a Roche LightCycler Nano instrument. The qPCR primers used are shown in Table 8 below. Relative gene expression was calculated by the ΔΔCq method after normalization of the qPCR data to the 16S and 18S rRNA levels.

TABLE 8

| | Primer | | Primer nucleotide sequence (5'→3') | SEQ ID NO |
|---|---|---|---|---|
| Bacillus velezensis strain GH1-13 | yxaL | Forward | GTTTCTTGGCGGGACGGT | SEQ ID NO: 26 |
| | | Reverse | AGCACCGGAGTCAGCGTA | SEQ ID NO: 27 |
| | 16S rRNA | Forward | CCTACGGGAGGCAGCAGTAG | SEQ ID NO: 28 |
| | | Reverse | CAACAGAGCTTTACGATCCGAAA | SEQ ID NO: 29 |
| Arabidopsis Arabidopsis thaliana | GH3.3 | Forward | TCGGATAAAACCGATGAAGC | SEQ ID NO: 30 |
| | | Reverse | TCAACGACTCCTCCATTTCC | SEQ ID NO: 31 |
| | IAA1 | Forward | GGAAGTCACCAATGGGCTTA | SEQ ID NO: 32 |
| | | Reverse | GAGATATGGAGCTCCGTCCA | SEQ ID NO: 33 |
| | AFB4 | Forward | AATCGAGGACGAAGAAGCAA | SEQ ID NO: 34 |
| | | Reverse | TCTGCATTTCCACCATTTCA | SEQ ID NO: 35 |

TABLE 8-continued

| Primer | | Primer nucleotide sequence (5'→3') | SEQ ID NO |
|---|---|---|---|
| ACS11 | Forward | CCCACTTGGAACCTCTACCA | SEQ ID NO: 36 |
| | Reverse | ATCAAGCCAACACGAAATCC | SEQ ID NO: 37 |
| 18S rRNA | Forward | GCGTTTGAGAGGATGTGGCG GGGAAT | SEQ ID NO: 38 |
| | Reverse | TAAATGCGTCCCTTCCATAA GTCGGG | SEQ ID NO: 39 |

1-6. Plant Seed Treatment and Germination Rate Analysis

*Arabidopsis thaliana* and rice (*Oryza sativa*) seeds were disinfected with 2% hypochlorite and 0.05% Triton-X at room temperature (25° C.) for 10 minutes. The seeds were washed several times with sterile water, and then treated with the YxaL protein (purified in Example 1-1 and prepared at a concentration ranging from 0 to 100 mg/l) in a soaking solution at room temperature for 2 hours.

The treated seeds were planted on 0.5% NuSieve GTG agarose (FMC Bioproduct, Rockland, USA) plates containing 1% sucrose, and 0.05% MES buffer (pH 5.7) in 0.5% MS medium, which was supplemented with or without indole-3-acetic acid (Sigma, St Louis, USA) at the final concentration of 0.5 μM.

The germination rates of the *Arabidopsis thaliana* and rice seeds were evaluated 2 days after planting by counting germinated seeds under a microscope.

1-7. Statistical Analysis

Statistical analysis of experimental data from at least three independent replicates was carried out by Student's t-test and ANOVA analysis. The results were expressed as mean±standard deviation, and a P-value of less than 0.05 was considered statistically significant.

Example 2. Confirmation of YxaL Protein Derived from *B. velezensis* Strain GH1-13

25 mg YxaL protein was obtained in high yield by performing Example 1-2. In order to confirm whether the obtained protein derived from the *B. velezensis* strain GH1-13 was the YxaL protein, Example 1-3 was performed.

Figure 2:
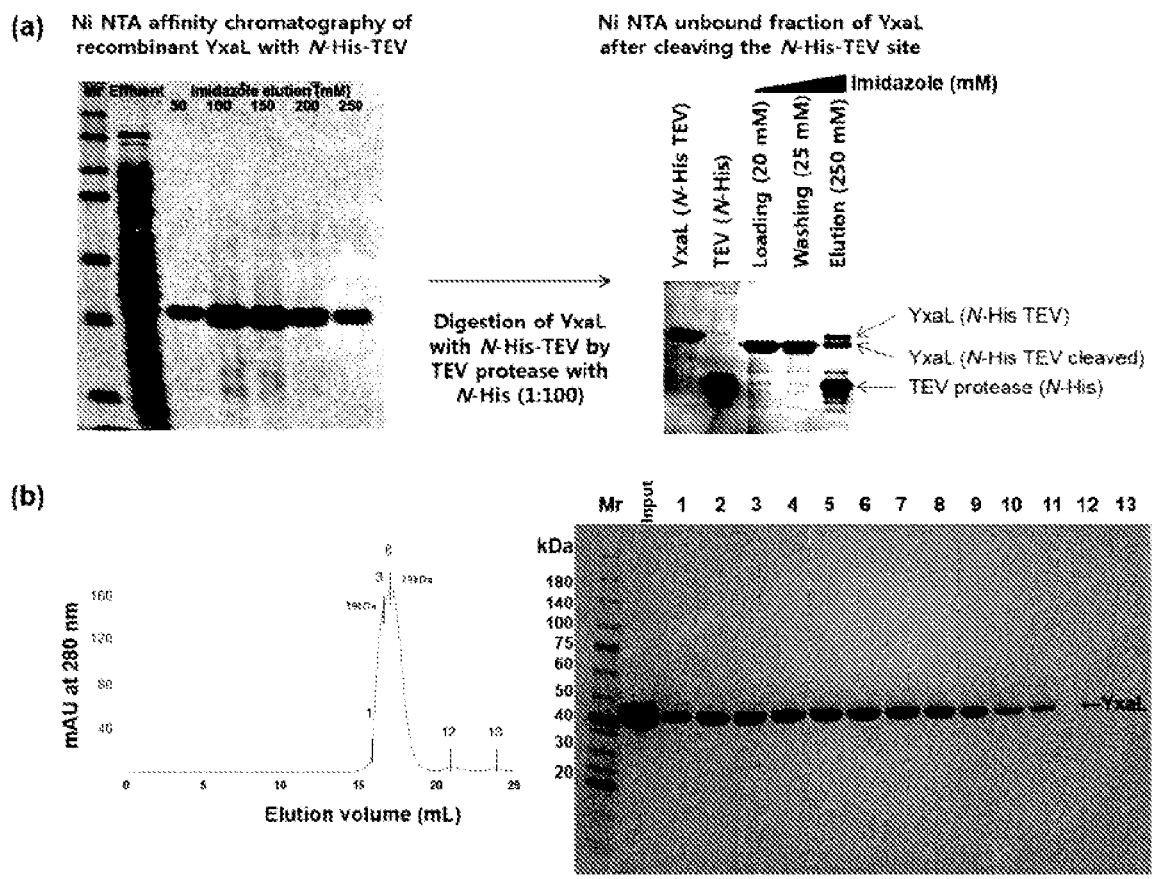
FIG. 2 shows recombinant protein production and the purification of a mature YxaL protein using a Ni NTA agarose column.

As a result, it was confirmed that the protein obtained in Example 1-2 was a monomeric protein having a molecular weight of 39,784 (FIG. 2). In addition, it was confirmed that the amino acid sequence of the protein, overexpressed in the YxaL gene recombinant *E. coli* system and purified using the Ni NTA column and the TEV protease, was the same as the amino acid sequence (amino acid residues 45 to 415; SEQ ID NO: 20) of the mature YxaL protein derived from the *Bacillus velezensis* strain GH1-13.

Example 3. Confirmation of Constitutive Expression of yxaL Gene in B. *Velezensis* Strain GH1-13

To confirm the growth pattern of the *B. velezensis* strain GH1-13, Example 1-1 was performed.

Figure 3:
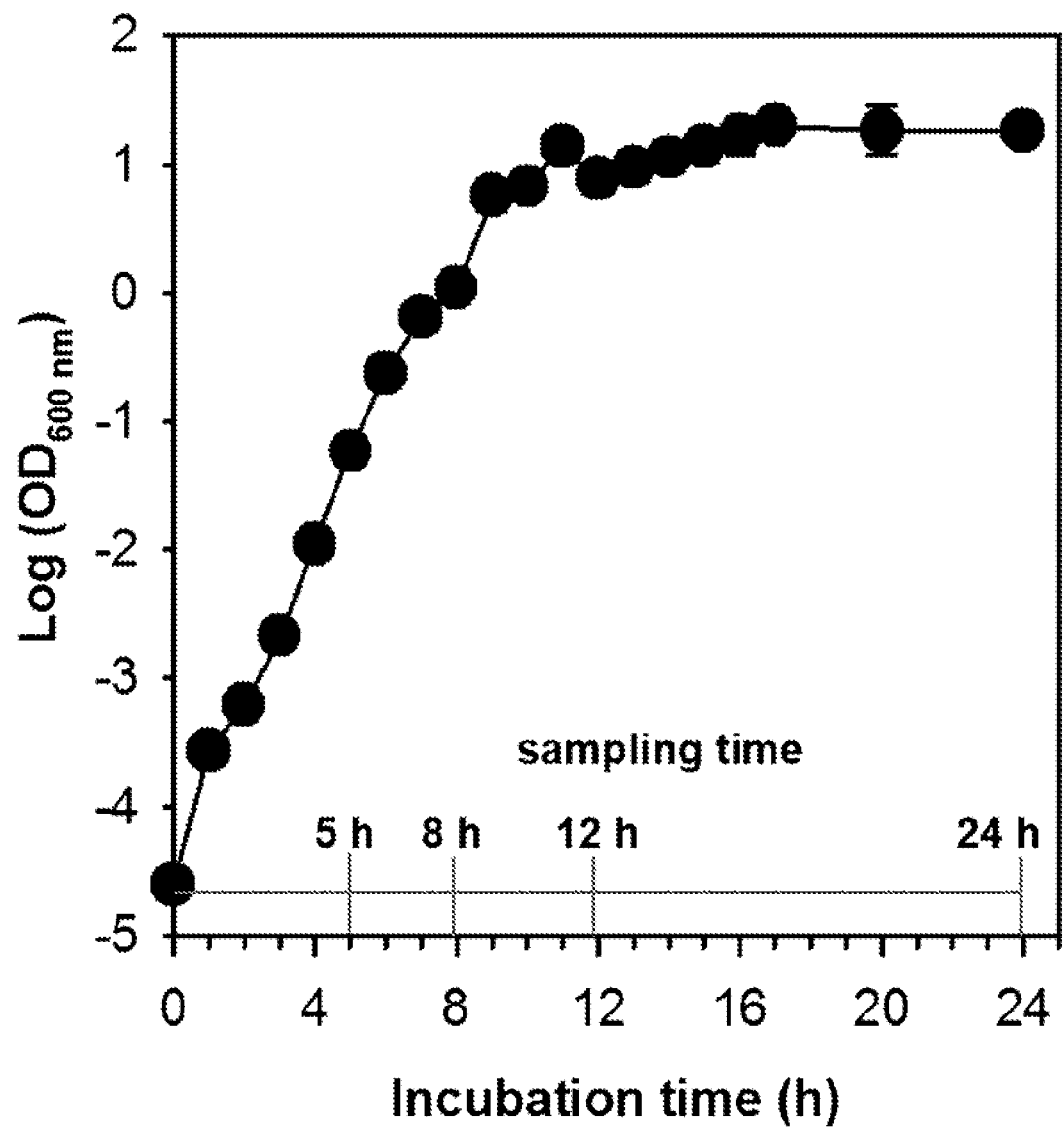
FIG. 3 is a graph showing the results of analyzing the growth curve of B. velezensis strain GH1-13 at an optical density of 600 nm (OD 600).

As a result, it was confirmed that the *B. velezensis* strain GH1-13 was grown in a growth curve pattern indicating the early-exponential phase of growth at 5 hours after incubation, the late-exponential phase of growth at 8 hours after incubation, the early-stationary phase of growth at 12 hours after incubation, and the stationary phase of growth at 24 hours after incubation (FIG. 3).

Meanwhile, to determine the constitutive expression of the yxaL gene at the above respective indicated times and the existence position of the YxaL protein, Examples 1-4 and 1-5 were performed.

Figure 4:
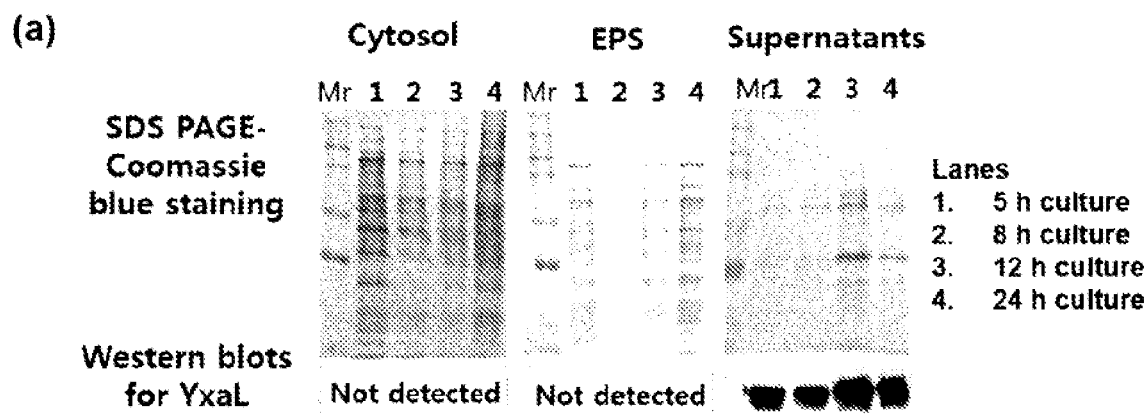
FIG. 4 shows the results of SDS PAGE and Western blotting performed to determine the position of the YxaL protein in the culture supernatant of the B. velezensis strain GH1-13.
Figure 4:
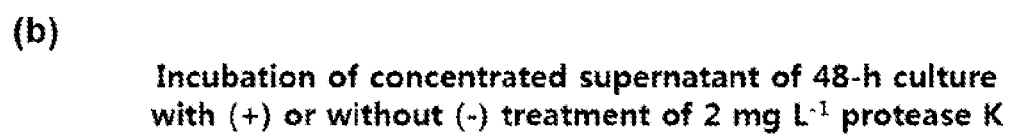
Figure 5:
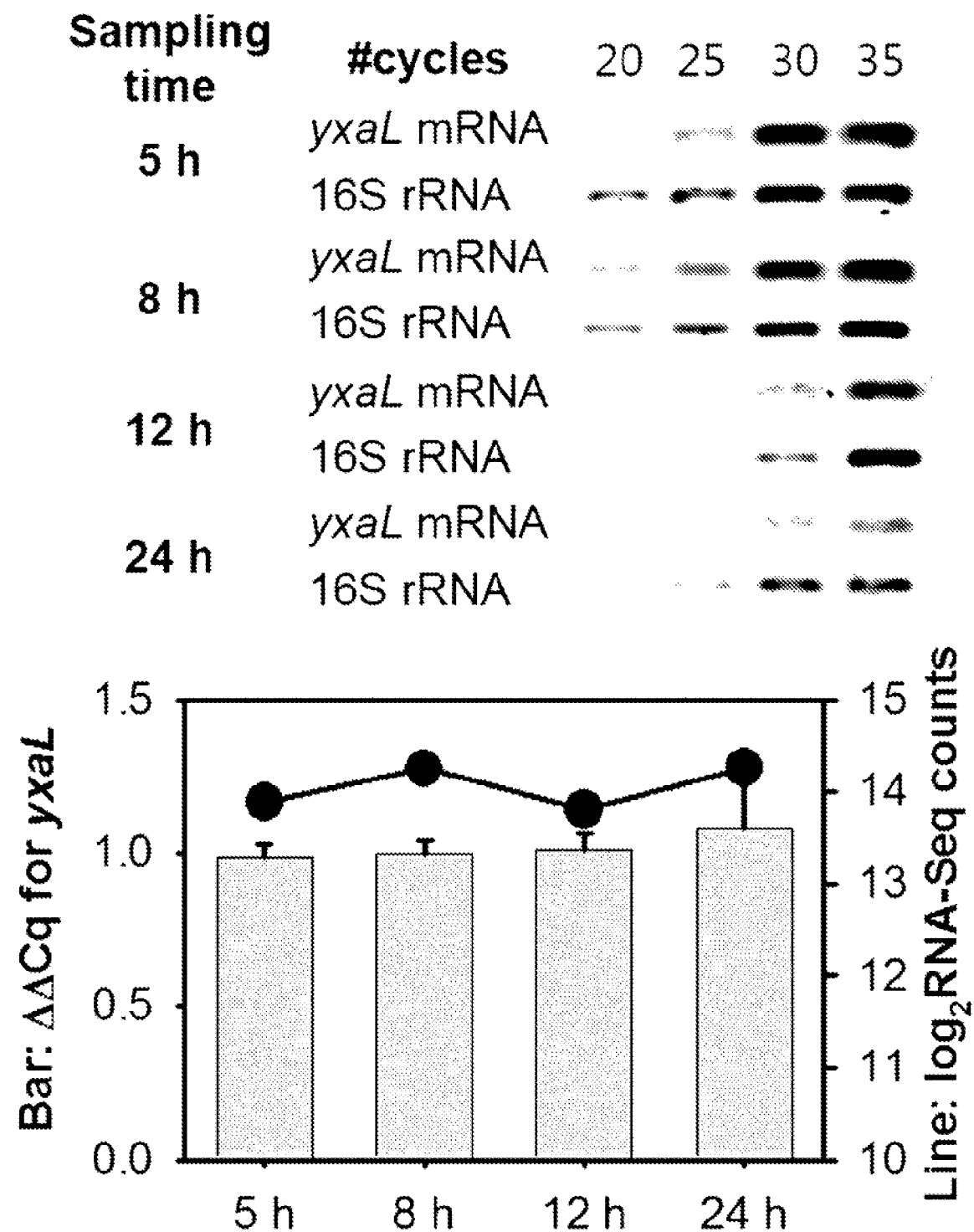
FIG. 5 shows the results of measuring the relative transcript levels of the yxaL gene to the 16S rRNA gene at varying time points (5, 8, 12 and 24 hours) of the growth phase of the B. velezensis strain GH1-13.

From the results of SDS PAGE and Western blotting, it was confirmed that the YxaL protein was expressed constitutively in cells and secreted out of the cells (FIG. 4a), and about 100 pg/1 of the YxaL protein having a half-life of 1.6 hours in the supernatant was produced (FIG. 4b). In addition, it was confirmed that these results were also consistent with the RT-PCR data (FIG. 5).

That is, it was confirmed that YxaL can be secreted into the medium through the cytoplasmic membrane by cooperation between the signal-recognizing particle complex having Fft and the Sec protein-secretion pathway.

Example 4. Confirmation of Plant Root Growth Promoting Effect of YxaL Protein on To examine the effect of YxaL on plant growth, the germination rates of *Arabidopsis* and rice seeds were evaluated by performing Example 1-6.

Figure 6:
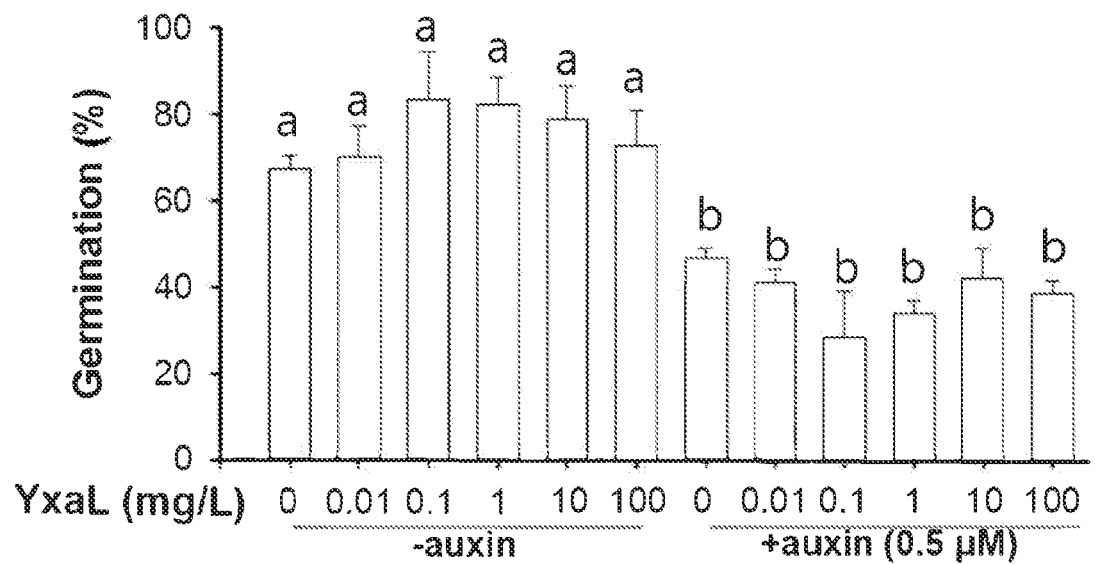
FIG. 6 is a graph showing the germination rates of Arabidopsis seeds treated with various concentrations of a purified YxaL protein in a soaking solution (n>100 for each group).

As a result, it was confirmed that, when auxin was not added to medium, there was no significant difference between the germination rate of seeds treated with the YxaL protein and the germination rate of seeds not treated with the YxaL protein, and even when auxin was added to medium, there was no significant difference between the germination rate of seeds treated with the YxaL protein and the germination rate of seeds not treated with the YxaL protein. However, it was confirmed that the germination rate was lower in the medium containing auxin than in the medium containing no auxin (FIG. 6).

Meanwhile, the lengths and states of roots by one-week cultivation of the *Arabidopsis* and rice seeds prepared in Example 1-6 were compared.

Figure 7:
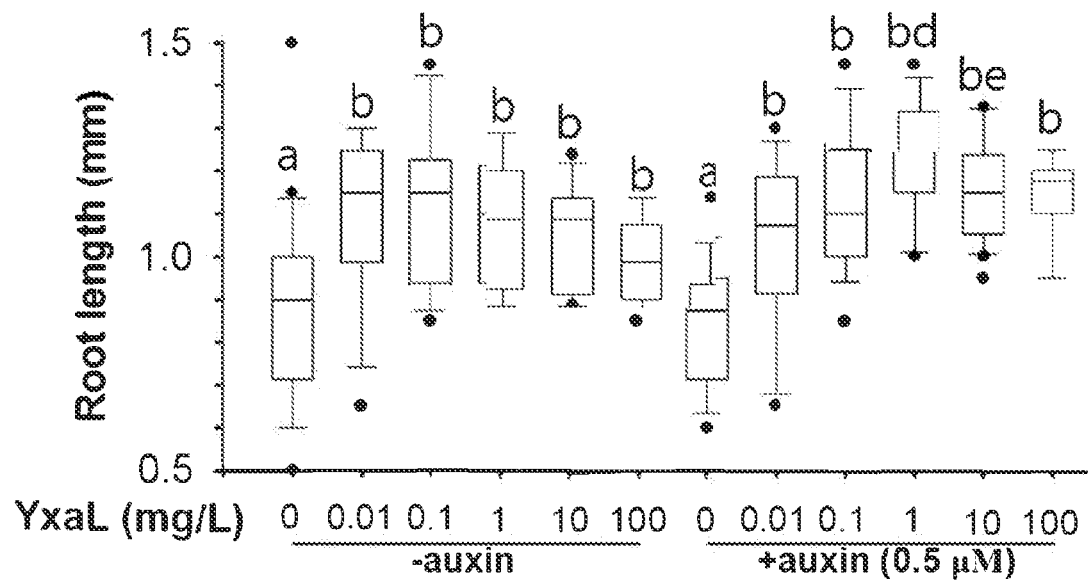
FIG. 7 is a graph showing the lengths of the 1-week-old roots of Arabidopsis treated with various concentrations of a purified YxaL protein in a soaking solution (n>30 for each group).
Figure 8:
FIG. 8 depicts photographs comparing the 1-week-old root structures of Arabidopsis treated with a purified YxaL protein at a concentration of 1 mg/ml in a soaking solution.
Figure 9:
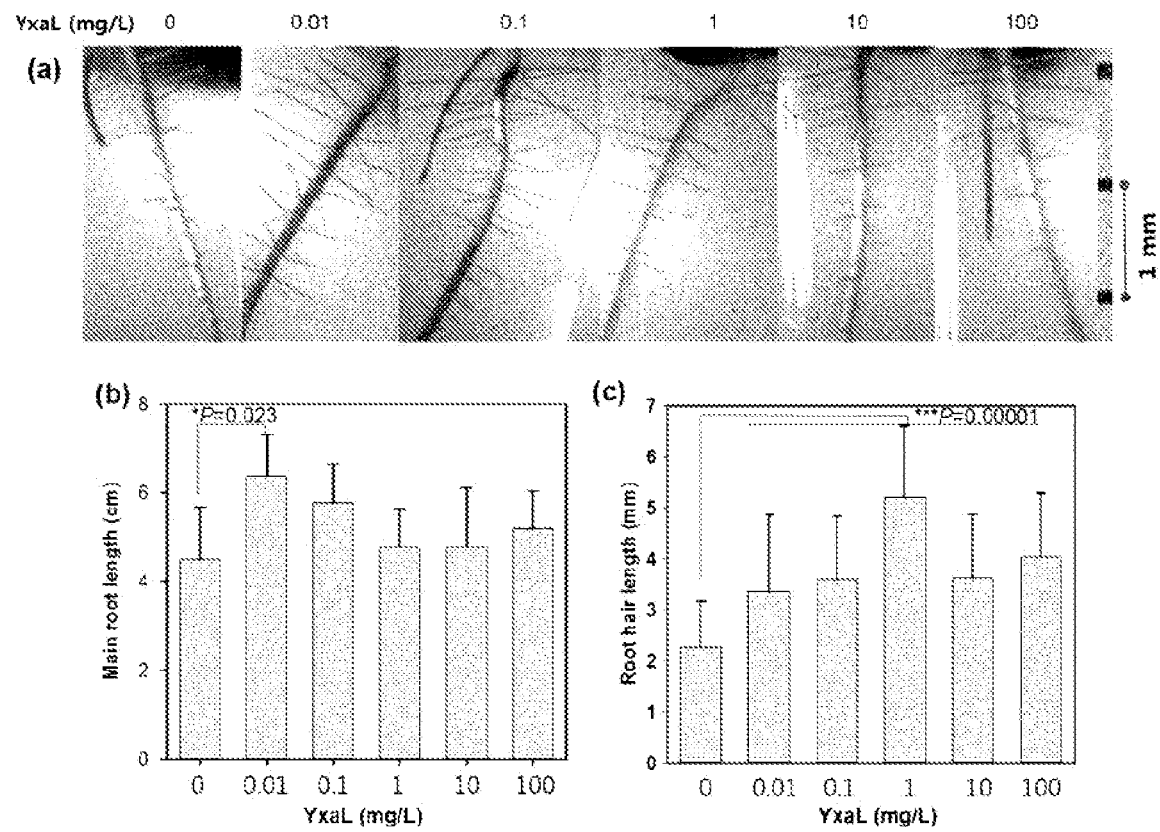
FIG. 9 shows the results of evaluating the effect of the YxaL protein on the development of rice seeds.

As a result, it was confirmed that, in the case of the seeds treated with the YxaL protein, roots having similar length were formed regardless of the presence or absence of auxin in the medium, and this root length was significantly longer than that of the roots obtained from the seeds not treated with the YxaL protein (FIG. 7). In addition, it was confirmed that, in the case of the seeds treated with the YxaL protein, lateral roots and hair roots significantly increased compared to those in the case of the seeds not treated with the YxaL proteins (FIG. 8). Effects similar to those of the YxaL protein on root growth and development were also found in the rice seeds (FIG. 9).

From the above-described results, it was confirmed that the YxaL protein can promote the growth of plant roots without affecting the germination rate of plant seeds, and the optimal concentration of the YxaL protein in the soaking solution was 1 mg/l.

Example 5. Confirmation of Effect of YxaL Protein on Change in Plant Gene Expression In order to confirm the effect of the YxaL protein on changes in plant gene expression, changes in the expression of IAA1 (auxin-responsive protein), GH3.3 (indole-3-acetic acid amino synthetase), ACS11 (1-aminocyclopropane-1-carboxylic acid synthase) and AFB4 (abscisic acid-responsive element binding factor) among plant genes were evaluated by performing Example 1-5 on RNA extracted from 1-week-old roots of *Arabidopsis* seeds prepared in Example 1-6. These plant genes respond to the auxin, ethylene and ABA (abscisic acid) present in *Arabidopsis* roots in early and later stages of seed germination.

Figure 10:
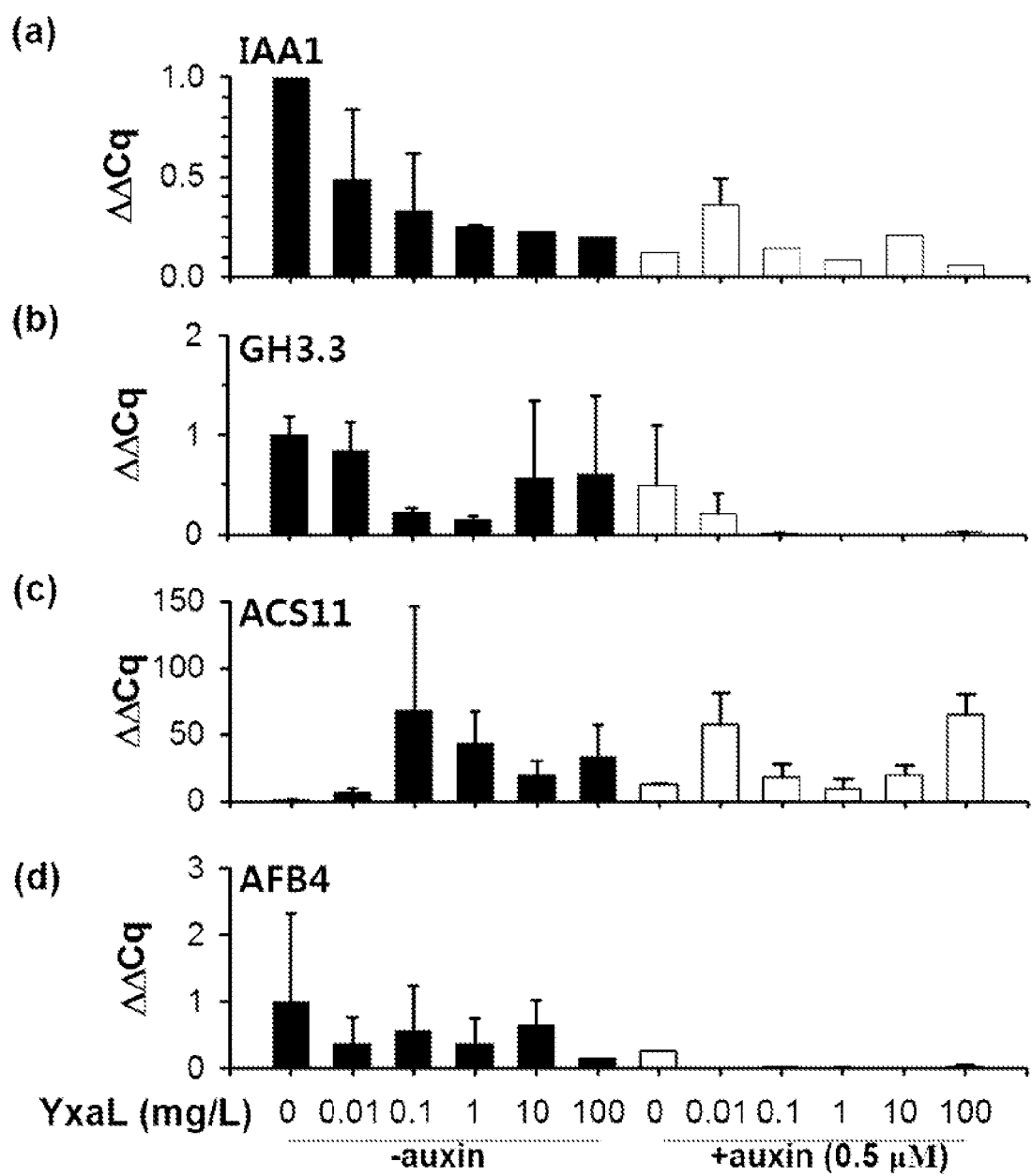
FIG. 10 depicts graphs showing the relative expression levels (ΔΔCq) of IAA1 (a), GH3.3 (b), ACS11 (c), and AFB4 (d) in the 1-week-old roots of Arabidopsis treated with various concentrations of a purified YxaL protein in a soaking solution.

As a result, it was confirmed that, when the seeds were soaked using the YxaL protein at a concentration of 10 to 100 pg/1 regardless of the presence or absence of auxin in the medium, the expression level of ACS11 in 1-week-old roots of *Arabidopsis* increased 34.5 times compared to that in the roots not treated with the YxaL protein, whereas the expression levels of IAA1, GH3.3 and ABF4 decreased compared to those in the roots not treated with the YxaL protein (FIG. 10). However, when YxaL protein-treated seeds were cultured in the auxin-supplemented medium, the inhibition of expression of GH3.3 and AFB4 was stronger than that of IAA1.

From the above-described results, it was confirmed that the YxaL protein could promote plant growth by affecting not only the auxin signaling pathway, but also other signaling pathways for plant growth and development.

So far, the present disclosure has been described with reference to the embodiments thereof. Those of ordinary skill in the art to which the present disclosure pertains will appreciate that the present disclosure may be embodied in modified forms without departing from the essential characteristics of the present disclosure. Therefore, the disclosed embodiments should be considered from an illustrative point of view, not from a restrictive point of view. The scope of the present disclosure is defined by the claims rather than the foregoing description, and all differences within the scope equivalent thereto should be construed as being included in the present disclosure.

The invention claimed is:

1. A method for germinating a plant seed of *Arabidopsis thaliana* or *Oryza sativa*, comprising the steps of:
   (1) isolating a YxaL protein;
   (2) soaking the plant seed in a soaking solution containing the isolated YxaL protein; and
   (3) germinating the soaked plant seed;

wherein the isolated YxaL protein is obtained from a *Bacillus velezensis* strain GH1-13;
   the isolated YxaL protein comprises the amino acid sequence of SEQ ID NO: 20; and the germinated seed has longer lateral root and hair root compared to a plant seed of *Arabidopsis thaliana* or *Oryza sativa* that is not soaked in the soaking solution containing the isolated YxaL protein.

* * * * *

SEQUENCE LISTING

```
<160> NUMBER OF SEQ ID NOS: 41

<210> SEQ ID NO 1
<211> LENGTH: 415
<212> TYPE: PRT
<213> ORGANISM: Bacillus sp.

<400> SEQUENCE: 1

Met Lys Lys Lys Thr Ala Ser Leu Arg Met Lys Thr Leu Ala Ala Gly
1               5                   10                  15

Ala Ala Val Ala Ala Ala Leu Ser Val Gly Ala Val Ser Asp Leu Pro
                20                  25                  30

Gly Ala Lys Trp Leu His Pro Ala Ala Ala Gln Ala Ala Glu Thr Val
            35                  40                  45

Phe Lys Gln Asn His Ala Ala Ser Gly Phe Leu Ala Gly Arg Tyr Asp
        50                  55                  60

Ala Gln Ala Met Ser Pro Thr Met Phe Asn Trp Ser Arg Glu Ser Arg
65                  70                  75                  80

Phe Thr Ser Thr Ala Asp Gly Ala Leu Lys Trp Glu Lys Asn Val Pro
                85                  90                  95

Ala Asn Pro Gln Asn Gly Ala Gly Ala Ala Val Asp Gly Asp Gly Thr
            100                 105                 110

Val Phe Ile Gln Ser Lys Asp Gly Lys Leu Thr Ala Tyr His Pro Asp
        115                 120                 125

Gly Thr Val Lys Trp Val Thr Glu Asn Leu Gly Thr Thr Tyr Thr Leu
    130                 135                 140

Thr Pro Val Leu Gly Thr Asn Gly Val Ile Tyr Leu Pro Ser His Asp
145                 150                 155                 160

Lys Lys Leu Tyr Phe Ile Asp Lys Glu Thr Gly Asn Ile Leu Thr Ser
                165                 170                 175

Val Pro Leu Ser Gly Ala Pro Ser Ser Asp Ala Ala Ile Gly Ser Asp
            180                 185                 190

Gly Thr Leu Tyr Val Ser Thr Leu Asp Asn Tyr Ile Tyr Ala Ile Lys
        195                 200                 205
```

-continued

Pro Thr Ser Pro Ser Thr Trp Thr Gln Lys Trp Lys Phe Lys Thr Asn
    210                 215                 220

Gly Val Val Gly Ser Ala Pro Val Leu Ala Ser Asn Gly Thr Leu Tyr
225                 230                 235                 240

Thr Ala Thr Tyr Asn Asn Ile Phe Tyr Ala Ile Asn Ser Gly Thr Gly
            245                 250                 255

Gln Val Lys Trp Ser Lys Thr Ser Asn Gly Phe Lys Gly Tyr Pro
        260                 265                 270

Val Ile Asp Arg Asp Gly Thr Val Tyr Ala Gly Asn Gln Asp Gly Asn
            275                 280                 285

Leu Tyr Ala Tyr Thr Ser Thr Gly Ala Val Lys Trp Thr Phe Pro Leu
    290                 295                 300

Asn Gly Phe Ser Ser Ser Ser Leu Ala Ile Asp His Asn Gly Asn Val
305                 310                 315                 320

Tyr Ile Gly Ser Gly Ser Gly Glu Leu Phe Ser Ile Ser Lys Thr Gly
                325                 330                 335

Asn Met Asn Trp Ser Phe Tyr Thr Asp Gly Pro Val Arg Thr Ala Pro
            340                 345                 350

Leu Ile Asp Ala Asp Gly Asn Val Tyr Phe Gly Ser Asp Asp Lys Asn
    355                 360                 365

Val Tyr Ala Val Asp Ala Asp Gly Asn Glu Lys Trp Arg Tyr Gln Thr
370                 375                 380

Asp Ser Asn Val Ile Ser Ser Pro Val Leu Ala Glu Asp Gly Thr Leu
385                 390                 395                 400

Tyr Val Gly Thr Tyr Thr Lys Leu Leu Ala Phe Gly Ala Lys Lys
            405                 410                 415

<210> SEQ ID NO 2
<211> LENGTH: 394
<212> TYPE: PRT
<213> ORGANISM: Bacillus sp.

<400> SEQUENCE: 2

Met Lys Ala Leu Ile Ala Gly Ala Ala Val Ala Ala Val Ser Ala
1               5                   10                  15

Gly Ala Val Ser Asp Val Pro Ala Ala Lys Val Leu Gln Pro Ala Ala
                20                  25                  30

Ala Tyr Ala Ala Glu Thr Val Phe Ser Gln Asn Asn Glu Ala Ser Gly
            35                  40                  45

Phe Leu Thr Gly Arg Tyr Asp Val Gln Ala Met Ala Pro Ala Met Phe
50                  55                  60

Asn Trp Ser Arg Glu Ser Arg Phe Ala Gly Asn Thr Asp Gly Thr Leu
65                  70                  75                  80

Lys Trp Gln Asn Asp Ile Arg Thr Thr Pro Gln Asn Gly Ala Gly Ala
                85                  90                  95

Val Ile Asp Gly Asp Gly Thr Val Tyr Leu His Ser Arg Asp Gly Glu
            100                 105                 110

Met Lys Ala Phe Asn Pro Asp Gly Ser Val Lys Trp Val Thr Gly Asn
        115                 120                 125

Leu Gly Lys Thr Phe Thr Gln Ser Pro Val Leu Gly Thr Asn Gly Val
    130                 135                 140

Ile Tyr Leu Ala Ser Tyr Asp Lys Lys Ile Tyr Phe Ile Asp Lys Glu
145                 150                 155                 160

Thr Gly Glu Ile Leu Thr Thr Val Pro Leu Ser Gly Gly Pro Ser Ser
                165                 170                 175

```
Glu Thr Val Ile Gly Ser Asp Gly Thr Leu Tyr Phe Ser Thr Leu Asp
            180                 185                 190

Asn Tyr Val His Ala Ile Lys Pro Thr Ser Lys Ser Thr Trp Thr Glu
        195                 200                 205

Arg Trp Lys Leu Lys Thr Asn Gly Val Val Ser Val Pro Val Leu
210                 215                 220

Ala Lys Asn Gly Thr Val Tyr Val Gly Thr Tyr Asn Asn Val Phe Tyr
225                 230                 235                 240

Ala Ile Asn Ser Gly Thr Gly Gln Val Lys Trp Ser Arg Thr Thr Ser
                245                 250                 255

Asn Ala Phe Lys Gly Tyr Pro Val Ile Asp Lys Asp Gly Thr Val Tyr
                260                 265                 270

Ala Gly Asn Gln Asp Gly Gln Leu Tyr Ala Tyr Thr Ser Thr Gly Ser
                275                 280                 285

Leu Lys Trp Thr Phe Pro Leu Asn Gly Phe Ser Ser Ser Pro Ala
290                 295                 300

Ile Asp His Asn Gly Asn Ile Tyr Ile Gly Ser Gly Ser Gly Glu Leu
305                 310                 315                 320

Phe Ser Ile Ser Lys Asn Gly Asp Met Asn Trp Ser Phe Tyr Thr Asp
                325                 330                 335

Gly Pro Val Arg Thr Ala Pro Leu Ile Asp Ala Lys Gly Thr Val Tyr
                340                 345                 350

Phe Gly Ser Asp Asp Met Lys Val Tyr Ala Ala Asp Ala Asn Gly Asn
                355                 360                 365

Glu Leu Trp Ser Tyr Gln Thr Asp Ser Asn Val Val Ser Ser Pro Gln
                370                 375                 380

Leu Ala Glu Asp Gly Thr Leu Tyr Ile Gly
385                 390

<210> SEQ ID NO 3
<211> LENGTH: 11
<212> TYPE: PRT
<213> ORGANISM: Bacillus sp.
<220> FEATURE:
<221> NAME/KEY: MOD_RES
<222> LOCATION: (2)..(2)
<223> OTHER INFORMATION: Any amino acid
<220> FEATURE:
<221> NAME/KEY: MOD_RES
<222> LOCATION: (4)..(5)
<223> OTHER INFORMATION: Any amino acid
<220> FEATURE:
<221> NAME/KEY: MOD_RES
<222> LOCATION: (9)..(10)
<223> OTHER INFORMATION: Any amino acid

<400> SEQUENCE: 3

Ala Xaa Asp Xaa Xaa Thr Gly Asp Xaa Xaa Trp
1               5                   10

<210> SEQ ID NO 4
<211> LENGTH: 11
<212> TYPE: PRT
<213> ORGANISM: Bacillus sp.

<400> SEQUENCE: 4

Phe Thr Ser Thr Ala Asp Gly Ala Leu Lys Trp
1               5                   10

<210> SEQ ID NO 5
```

```
<211> LENGTH: 11
<212> TYPE: PRT
<213> ORGANISM: Bacillus sp.

<400> SEQUENCE: 5

Thr Ala Tyr His Pro Asp Gly Thr Val Lys Trp
1               5                   10

<210> SEQ ID NO 6
<211> LENGTH: 11
<212> TYPE: PRT
<213> ORGANISM: Bacillus sp.

<400> SEQUENCE: 6

Phe Ile Asp Lys Glu Thr Gly Asn Ile Leu Thr
1               5                   10

<210> SEQ ID NO 7
<211> LENGTH: 11
<212> TYPE: PRT
<213> ORGANISM: Bacillus sp.

<400> SEQUENCE: 7

Pro Thr Ser Pro Ser Thr Trp Thr Gln Lys Trp
1               5                   10

<210> SEQ ID NO 8
<211> LENGTH: 11
<212> TYPE: PRT
<213> ORGANISM: Bacillus sp.

<400> SEQUENCE: 8

Ala Ile Asn Ser Gly Thr Gly Gln Val Lys Trp
1               5                   10

<210> SEQ ID NO 9
<211> LENGTH: 11
<212> TYPE: PRT
<213> ORGANISM: Bacillus sp.

<400> SEQUENCE: 9

Tyr Ala Tyr Thr Ser Thr Gly Ala Val Lys Trp
1               5                   10

<210> SEQ ID NO 10
<211> LENGTH: 11
<212> TYPE: PRT
<213> ORGANISM: Bacillus sp.

<400> SEQUENCE: 10

Phe Ser Ile Ser Lys Thr Gly Asn Met Asn Trp
1               5                   10

<210> SEQ ID NO 11
<211> LENGTH: 11
<212> TYPE: PRT
<213> ORGANISM: Bacillus sp.

<400> SEQUENCE: 11

Tyr Ala Val Asp Ala Asp Gly Asn Glu Lys Trp
1               5                   10

<210> SEQ ID NO 12
<211> LENGTH: 11
<212> TYPE: PRT
```

<213> ORGANISM: Bacillus sp.

<400> SEQUENCE: 12

Phe Ala Gly Asn Thr Asp Gly Thr Leu Lys Trp
1               5                   10

<210> SEQ ID NO 13
<211> LENGTH: 11
<212> TYPE: PRT
<213> ORGANISM: Bacillus sp.

<400> SEQUENCE: 13

Lys Ala Phe Asn Pro Asp Gly Ser Val Lys Trp
1               5                   10

<210> SEQ ID NO 14
<211> LENGTH: 11
<212> TYPE: PRT
<213> ORGANISM: Bacillus sp.

<400> SEQUENCE: 14

Phe Ile Asp Lys Glu Thr Gly Glu Ile Leu Thr
1               5                   10

<210> SEQ ID NO 15
<211> LENGTH: 11
<212> TYPE: PRT
<213> ORGANISM: Bacillus sp.

<400> SEQUENCE: 15

Pro Thr Ser Lys Ser Thr Trp Thr Glu Arg Trp
1               5                   10

<210> SEQ ID NO 16
<211> LENGTH: 11
<212> TYPE: PRT
<213> ORGANISM: Bacillus sp.

<400> SEQUENCE: 16

Ala Ile Asn Ser Gly Thr Gly Gln Val Lys Trp
1               5                   10

<210> SEQ ID NO 17
<211> LENGTH: 11
<212> TYPE: PRT
<213> ORGANISM: Bacillus sp.

<400> SEQUENCE: 17

Tyr Ala Tyr Thr Ser Thr Gly Ser Leu Lys Trp
1               5                   10

<210> SEQ ID NO 18
<211> LENGTH: 11
<212> TYPE: PRT
<213> ORGANISM: Bacillus sp.

<400> SEQUENCE: 18

Tyr Ala Tyr Thr Ser Thr Gly Ser Leu Lys Trp
1               5                   10

<210> SEQ ID NO 19
<211> LENGTH: 11
<212> TYPE: PRT
<213> ORGANISM: Bacillus sp.

<400> SEQUENCE: 19

Tyr Ala Ala Asp Ala Asn Gly Asn Glu Leu Trp
1               5                   10

<210> SEQ ID NO 20
<211> LENGTH: 415
<212> TYPE: PRT
<213> ORGANISM: Bacillus sp.

<400> SEQUENCE: 20

Met Lys Lys Lys Thr Ala Ser Leu Arg Met Lys Thr Leu Ala Ala Gly
1               5                   10                  15

Ala Ala Val Ala Ala Leu Ser Val Gly Ala Val Ser Asp Leu Pro
            20                  25                  30

Gly Ala Lys Trp Leu His Pro Ala Ala Gln Ala Ala Glu Thr Val
            35                  40                  45

Phe Lys Gln Asn His Ala Ala Ser Gly Phe Leu Ala Gly Arg Tyr Asp
    50                  55                  60

Ala Gln Ala Met Ser Pro Thr Met Phe Asn Trp Ser Arg Glu Ser Arg
65                  70                  75                  80

Phe Thr Ser Thr Ala Asp Gly Ala Leu Lys Trp Glu Lys Asn Val Pro
                85                  90                  95

Ala Thr Pro Gln Asn Gly Ala Gly Ala Ala Val Asp Gly Asp Gly Thr
            100                 105                 110

Val Phe Ile Gln Ser Lys Asp Gly Lys Leu Thr Ala Tyr His Pro Asp
        115                 120                 125

Gly Thr Val Lys Trp Val Thr Glu Asn Leu Gly Thr Thr Tyr Thr Leu
    130                 135                 140

Thr Pro Val Leu Gly Thr Asn Gly Val Ile Tyr Leu Pro Ser His Asp
145                 150                 155                 160

Lys Lys Leu Tyr Phe Ile Asp Lys Glu Thr Gly Asn Ile Leu Thr Ser
                165                 170                 175

Val Pro Leu Ser Gly Ala Pro Ser Ser Asp Ala Ala Ile Gly Ser Asp
            180                 185                 190

Gly Thr Leu Tyr Val Ser Thr Leu Asp Asn Tyr Ile Tyr Ala Ile Lys
        195                 200                 205

Pro Thr Ser Pro Ser Thr Trp Thr Gln Lys Trp Lys Phe Lys Thr Asn
    210                 215                 220

Gly Val Val Gly Ser Ala Pro Val Leu Ala Ser Asn Gly Thr Leu Tyr
225                 230                 235                 240

Thr Ala Thr Tyr Asn Asn Ile Phe Tyr Ala Ile Asn Ser Gly Thr Gly
                245                 250                 255

Gln Val Lys Trp Ser Lys Thr Ser Asn Gly Phe Lys Gly Tyr Pro
            260                 265                 270

Val Ile Asp Arg Asp Gly Thr Val Tyr Ala Gly Asn Gln Asp Gly Asn
        275                 280                 285

Leu Tyr Ala Tyr Thr Ser Thr Gly Ala Val Lys Trp Thr Phe Pro Leu
    290                 295                 300

Asn Gly Phe Ser Ser Ser Ser Leu Ala Ile Asp His Asn Gly Asn Val
305                 310                 315                 320

Tyr Ile Gly Ser Gly Ser Gly Glu Leu Phe Ser Ile Ser Lys Thr Gly
                325                 330                 335

Asn Met Asn Trp Ser Phe Tyr Asp Gly Pro Val Arg Thr Ala Pro
            340                 345                 350

Leu Ile Asp Ala Asp Gly Asn Val Tyr Phe Gly Ser Asp Asp Lys Asn
            355                 360                 365

Val Tyr Ala Val Asp Ala Asp Gly Asn Glu Lys Trp Arg Tyr Gln Thr
    370                 375                 380

Asp Ser Asn Val Ile Ser Ser Pro Val Leu Ala Glu Asp Gly Thr Leu
385                 390                 395                 400

Tyr Val Gly Thr Tyr Thr Lys Leu Leu Ala Phe Gly Ala Lys Lys
                405                 410                 415

<210> SEQ ID NO 21
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: YxaL_forward

<400> SEQUENCE: 21
gcggaaacgg tatttaaaca aaat                                      24

<210> SEQ ID NO 22
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: YxaL_reverse

<400> SEQUENCE: 22 ttatttttt gccccgaatg cga                                         23

<210> SEQ ID NO 23
<211> LENGTH: 32
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: YxaL(NcoI)_forward

<400> SEQUENCE: 23
ggcccatggc ggaaacggta tttaaacaaa at                              32

<210> SEQ ID NO 24
<211> LENGTH: 32
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: YxaL(XhoI)_reverse

<400> SEQUENCE: 24
gggctcgagt tattttttg ccccgaatgc ga                               32

<210> SEQ ID NO 25
<211> LENGTH: 1119
<212> TYPE: DNA
<213> ORGANISM: Bacillus sp.

<400> SEQUENCE: 25

```
atggcggaaa cggtatttaa acaaaatcat gcggcatccg gtttcttggc gggacggtat    60
gacgcgcagg cgatgtctcc gacgatgttc aactggtcaa gagaaagccg gtttacaagc    120
actgccgatg gcgcattaaa atgggaaaag aatgtcccgg ccacccctca aaacggtgcg    180
ggagccgcgg ttgatgggga cggcaccgta tttattcaat caaagacgg gaagctgacg    240 gcgtatcatc cggacggtac tgtgaaatgg gtgacggaaa acctcgggac gacctatacg    300
ctgactccgg tgctcggaac aaacggtgtc atttatcttc cttctcacga taaaaaacta    360
tatttcatcg acaaagaaac cggaaacatt ttaacatcgg ttccgttgag cggagcgcct    420
agttccgatg cggctatcgg ctctgacggc acgctgtatg tgtcgacgct ggataactat    480
atctatgcga ttaaaccgac gtcgccttcg acatggacgc aaaagtggaa gtttaaaaca    540
aacggcgtgg tcggctccgc tcccgtgtta gcgtcaaacg gcacgctgta tacggcaacg    600
tacaataata tcttttacgc gatcaattcc ggaacaggcc aagtgaaatg gtcaaaaacg    660
acgtccaacg ggtttaaagg ctatccggtt attgatagag acggcaccgt ttacgccgga    720
aaccaggacg gcaatttata cgcctataca tcaacgggtg ctgtaaagtg gacgttcccg    780
ttaaacggtt tctccagctc ttcattagcg atcgaccata acggcaatgt gtatatcggt    840
tccggaagcg gcgagctgtt ttccatcagc aaaaccggca atatgaactg gtctttctat    900
acggacgggc ctgtgagaac ggcgccgctg attgatgcgg acggcaatgt gtacttcggt    960
tctgacgata aaaatgtcta tgcggttgac gctgacggta atgaaaaatg gcgctatcaa   1020
acagacagca atgtcatttc ctcccccggtt ctggctgaag acggcacgct ctatgtcggc   1080
acttatacga aactgctcgc attcggggca aaaaaataa                          1119

<210> SEQ ID NO 26
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: YxaL(GH1-13)_forward

<400> SEQUENCE: 26
gtttcttggc gggacggt                                                   18

<210> SEQ ID NO 27
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: YxaL(GH1-13)_reverse

<400> SEQUENCE: 27
agcaccggag tcagcgta                                                   18

<210> SEQ ID NO 28
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: 16S rRNA(GH1-13)_forward
```

<400> SEQUENCE: 28
cctacgggag gcagcagtag                                         20

<210> SEQ ID NO 29
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: 16S rRNA(GH1-13)_reverse

<400> SEQUENCE: 29
caacagagct ttacgatccg aaa                                     23

<210> SEQ ID NO 30
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: GH3.3_forward

<400> SEQUENCE: 30
tcggataaaa ccgatgaagc                                         20

<210> SEQ ID NO 31
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: GH3.3_reverse

<400> SEQUENCE: 31
tcaacgactc ctccatttcc                                         20

<210> SEQ ID NO 32
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: IAA1_forward

<400> SEQUENCE: 32
ggaagtcacc aatgggctta                                         20

<210> SEQ ID NO 33
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: IAA1_reverse

<400> SEQUENCE: 33
gagatatgga gctccgtcca                                         20

<210> SEQ ID NO 34
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide
<220> FEATURE:
<223> OTHER INFORMATION: AFB4_forward

<400> SEQUENCE: 34
aatcgaggac gaagaagcaa                                           20

<210> SEQ ID NO 35
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide
<220> FEATURE:
<223> OTHER INFORMATION: AFB4_reverse

<400> SEQUENCE: 35
tctgcatttc caccatttca                                           20

<210> SEQ ID NO 36
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide
<220> FEATURE:
<223> OTHER INFORMATION: ACS11_forward

<400> SEQUENCE: 36
cccacttgga acctctacca                                           20

<210> SEQ ID NO 37
<211> LENGTH: 20
<212> TYPE: DNA
<213> ORGANISM: Artificial Sequence
<220> FEATURE:
<223> OTHER INFORMATION: Description of Artificial Sequence: Synthetic
    oligonucleotide
<220> FEATURE:
<223> OTHER INFORMATION: ACS11_reverse

<400> SEQUENCE: 37
atcaagccaa cacgaaatcc                                           20

<210> SEQ ID NO 38
<211> LENGTH: 26
<212> TYPE: DNA
<213> ORGANISM: Artificial Sequence
<220> FEATURE:
<223> OTHER INFORMATION: Description of Artificial Sequence: Synthetic
    oligonucleotide
<220> FEATURE:
<223> OTHER INFORMATION: 18S rRNA_forward

<400> SEQUENCE: 38
gcgtttgaga ggatgtggcg gggaat                                    26

<210> SEQ ID NO 39
<211> LENGTH: 26

```
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: 18S rRNA_reverse

<400> SEQUENCE: 39
taaatgcgtc ccttccataa gtcggg                                           26

<210> SEQ ID NO 40
<211> LENGTH: 11
<212> TYPE: PRT
<213> ORGANISM: Bacillus sp.
<220> FEATURE:
<221> NAME/KEY: MOD_RES
<222> LOCATION: (2)..(2)
<223> OTHER INFORMATION: Any amino acid
<220> FEATURE:
<221> NAME/KEY: MOD_RES
<222> LOCATION: (4)..(5)
<223> OTHER INFORMATION: Any amino acid
<220> FEATURE:
<221> NAME/KEY: MOD_RES
<222> LOCATION: (9)..(10)
<223> OTHER INFORMATION: Any amino acid

<400> SEQUENCE: 40

Ala Xaa Asn Xaa Xaa Thr Gly Glu Xaa Xaa Trp
1               5                   10

<210> SEQ ID NO 41
<211> LENGTH: 11
<212> TYPE: PRT
<213> ORGANISM: Bacillus sp.
<220> FEATURE:
<221> NAME/KEY: MOD_RES
<222> LOCATION: (2)..(2)
<223> OTHER INFORMATION: Any amino acid
<220> FEATURE:
<221> NAME/KEY: MOD_RES
<222> LOCATION: (4)..(5)
<223> OTHER INFORMATION: Any amino acid
<220> FEATURE:
<221> NAME/KEY: MOD_RES
<222> LOCATION: (9)..(10)
<223> OTHER INFORMATION: Any amino acid

<400> SEQUENCE: 41

Ala Xaa Asp Xaa Xaa Thr Gly Lys Xaa Xaa Trp
1               5                   10
```